United States Patent
Tuttrup et al.

(10) Patent No.: US 7,272,571 B2
(45) Date of Patent: Sep. 18, 2007

(54) METHOD AND APPARATUS FOR EFFECTIVE DISTRIBUTION AND DELIVERY OF GOODS ORDERED ON THE WORLD-WIDE-WEB

(75) Inventors: Robert W. Tuttrup, Sparta, NJ (US); Neil A. Willcocks, Flanders, NJ (US); Thomas M. Collins, Nazareth, PA (US); Mark J. Chimel, Long Valley, NJ (US); Kevin L. Rabinovitch, Hackettstown, NJ (US); Henry V. Izzo, Bridgewater, NJ (US)

(73) Assignee: Mars Incorporated, McLean, VA (US)

( * ) Notice: Subject to any disclaimer, the term of this patent is extended or adjusted under 35 U.S.C. 154(b) by 505 days.

(21) Appl. No.: 09/855,558

(22) Filed: May 16, 2001

(65) Prior Publication Data

US 2002/0038266 A1  Mar. 28, 2002

Related U.S. Application Data

(60) Provisional application No. 60/216,661, filed on Jul. 7, 2000.

(51) Int. Cl.
*G06G 1/14* (2006.01)
(52) U.S. Cl. .............................. 705/22; 705/28; 705/26
(58) Field of Classification Search .................. 705/26, 705/27
See application file for complete search history.

(56) References Cited

U.S. PATENT DOCUMENTS

| | | | |
|---|---|---|---|
| 5,068,797 A | 11/1991 | Sansone et al. ............. 364/478 |
| 5,710,887 A | 1/1998 | Chelliah et al. ............ 395/226 |
| 5,717,989 A | 2/1998 | Tozzoli et al. ................ 705/37 |
| 5,758,329 A | 5/1998 | Wojcik et al. ................ 705/28 |
| 5,848,399 A | 12/1998 | Burke .......................... 705/27 |
| 5,890,136 A * | 3/1999 | Kipp ........................... 705/22 |
| 5,960,411 A | 9/1999 | Hartman et al. .............. 705/26 |
| 6,026,376 A | 2/2000 | Kenney ....................... 705/27 |
| 6,026,377 A | 2/2000 | Burke .......................... 705/27 |
| 6,032,130 A | 2/2000 | Alloul et al. ................. 705/27 |
| 6,055,514 A | 4/2000 | Wren .......................... 705/27 |
| 6,058,373 A | 5/2000 | Blinn et al. .................. 705/26 |

(Continued)

FOREIGN PATENT DOCUMENTS

| | | | |
|---|---|---|---|
| EP | 1235407 | * | 8/2002 |
| EP | WO 20/091700 A2 | * | 11/2002 |
| JP | 10134300 A | * | 5/1998 |
| WO | WO 00/017798 | | 3/2000 |
| WO | WO 02/15063 A2 | | 2/2002 |

OTHER PUBLICATIONS

Gooley, Toby, "Keeping and eye on Asia", Logistics Management and Distribution Report, dated May 1998.*

(Continued)

*Primary Examiner*—Mark Fadok
(74) *Attorney, Agent, or Firm*—Fitzpatrick, Cella, Harper & Scinto

(57) ABSTRACT

An apparatus and method for delivering goods ordered by a plurality of customers, in which a plurality of customers place orders for goods from a vendor, the vendor fulfills its orders by combining into a single shipping order the goods ordered by a plurality of customers who are geographically close to a single local pick-up point, and the vendor causes the single shipping order to be sent to a local pick-up point.

30 Claims, 5 Drawing Sheets

U.S. PATENT DOCUMENTS

| | | | |
|---|---|---|---|
| 6,336,100 B1 * | 1/2002 | Yamada | 705/26 |
| 6,728,685 B1 * | 4/2004 | Ahluwalia | 705/26 |
| 6,907,825 B2 * | 6/2005 | Bottger et al. | 101/240 |
| 6,970,825 B1 * | 11/2005 | Altendahl et al. | 705/1 |
| 2001/0027471 A1 * | 10/2001 | Paulose et al. | 709/203 |
| 2001/0042023 A1 * | 11/2001 | Anderson et al. | 705/26 |
| 2002/0077937 A1 * | 6/2002 | Lyons et al. | 705/28 |

OTHER PUBLICATIONS

Waller et al., "Vendor-Managed Inventory in the Retail Supply Chain," J. Business Logistics (1999), 20(1):183-203.

Beamon, "Supply Chain Design Analysis: Models & Methods," Int'l. J. Production Economics (1998), 55(3):281-294.

* cited by examiner

METHOD AND APPARATUS FOR EFFECTIVE DISTRIBUTION AND DELIVERY OF GOODS ORDERED ON THE WORLD-WIDE-WEB

CROSS-REFERENCE TO RELATED APPLICATION

This application claims benefit of U.S. Provisional Application No. 60/216,661, filed Jul. 7, 2000, which is hereby incorporated by reference.

BACKGROUND OF THE INVENTION

1. Field of the Invention

The present invention relates to apparatuses and methods for distribution and delivery of ordered goods, and in particular to apparatuses and methods for distribution and delivery of goods ordered on the World Wide Web. In a preferred embodiment of the present invention, apparatuses and methods are provided for delivering ordered goods to a local distribution center instead of directly to customers' houses for the benefit of reduced shipping costs, and better handling of perishables.

2. Related Background

Internet shopping sites have abounded in recent years. In these sites, shoppers generally peruse goods that are offered for sale on-line, and can earmark goods for purchase by clicking certain icons to place them in a virtual "shopping cart" for later purchasing. The purchase can then be consummated by proceeding to a "check-out" page or pages, in which certain information, such as payment information (typically a credit card number) and delivery information (typically the home address of the shopper), is entered. In an alternative model, such as the model disclosed in U.S. Pat. No. 5,960,411 to Hartman et al., no shopping cart is used, and the purchase is consummated simply by clicking-on the desired item, with the payment and delivery information having been previously entered.

In either case, an Internet shopping site suffers from a significant drawback in comparison with a conventional brick-and-mortar store: because in most cases a purchased good cannot be provided to the shopper via the Internet, it must be provided via delivery or some other similar mechanism. By far, the most common way of doing that is to ship the ordered goods to the shopper's home, using a carrier such as United Parcel Service (UPS), or the like. Such carriers, of course, must be paid for their services, increasing the cost of selling and/or buying goods over the Internet.

In addition to the added expense, both to the vendor and to the recipient, of home delivery, carrier-based home delivery of goods suffers from a further disadvantage in that it often occurs at a time when no one is home to accept delivery. This problem is exacerbated by the fact that generally recipients are not notified by the carrier as to the time a package will be delivered. This phenomenon can be quite inconvenient for people who are away from their homes or apartments at work for the better part of each day.

Attempts at providing "centralized shopping sites" have been made to consolidate ordering activities. In a site maintained by Lycos, for example, various Web-based vendors are made available by clicking an icon from the central Lycos portal site. Clicking an icon brings you to the associated vendor's site. However, when you visit the site, your display is always framed by Lycos subject matter. Thus, while the appearance of centralized shopping may be given, the purchases are done at the individual sites, using their individualized purchasing and shipping methodologies.

U.S. Pat. No. 5,895,454 to Harrington is directed to an integrated interface for shopping Web sites as well as non-Internet vendors. A database is provided that includes real Internet vendor sites, corresponding to vendors having sites on the Internet, and virtual Internet vendor sites, which correspond to vendors not having a site on the Internet. A consumer can purchase goods from either of these types of vendors from a common location, using a universal "shopping trolley". Ordered items, however, are still shipped by the individual vendors to the shipper's home.

While adding convenience for the consumer, these centralized shopping sites do not address the problem of significant costs for the shipment of the ordered goods.

Also known, are warehouse/member clubs which provide discounted merchandise to consumers based upon volume discounts. While allowing a shopper to purchase many items at a single location, these outlets provide neither the convenience of "shop at home" offered by the Internet, nor the almost unlimited selection available on-line.

A post office (P.O.) box allows a consumer to receive all of his or her merchandise at a centralized location. However, shipment of merchandise to a P.O. box provides limited benefit to consumers and essentially no benefit to vendors. With regard to consumers, maintenance of the P.O. box costs money. Therefore, any convenience of central location for the consumer must be balanced against the cost. Further, from the point of view of the vendor, the fact that each customer maintains a central pick-up point results in no consolidation of ordered goods, since goods are still sent to a separate P.O. box for each consumer, resulting in no economies of scale and leaving the vendor with significant shipping charges to pass along to all of its customers.

Further, from the consumer's perspective, P.O. boxes provide no notification of the arrival of ordered items, have predetermined limits to the size of the delivered items, and provide limited access times to pick-up the delivered items. In addition, the consumer is not kept informed of the fact that a shipment may contain perishable items and may delay picking up the package, especially if he or she is used to making a once a week pickup.

Thus, there is a need to provide for an efficient way for vendors to centralize the shipping process to allow vendors to gain the benefit of consolidated shipping and to provide significant cost and convenience advantages to consumers.

SUMMARY OF THE INVENTION

The present invention addresses the above concerns and presents new and novel apparatuses and processes for distribution and delivery of orders, for example, where in a preferred embodiment, orders are placed at a shopping site on the World Wide Web (the "Web"). The invention provides local pickup to the extent possible by transporting and delivering received orders to a local pickup site to consolidate shipments from vendors. In an example embodiment, locally available items are earmarked for the user at the local pick-up site. Items not available locally are handled by the system communicating with remote vendors and arranging delivery either to the local pickup site or directly to the user.

In accordance with one aspect of the present invention, there is provided a method for delivering goods ordered by a plurality of customers. The method includes the steps of a plurality of customers placing orders for goods from a vendor; the vendor fulfilling its orders by combining into a single shipping order the goods ordered by a plurality of customers who are geographically close to a single local pick-up; and the vendor causing the single shipping order to be sent to a local pick-up point.

In accordance with another aspect of the present invention, there is provided a method for designating local receipt of items ordered from a vendor at a remote location. The method includes the steps of: the customer providing to the vendor the customer's location; the customer choosing from local pick-up points offered by the vendor; and upon receipt of the ordered items at the local pick-up point, receiving notification that the order is available for pick-up.

In accordance with another aspect of the present invention, there is provided a method for delivering goods ordered by a plurality of customers. The method includes the steps of: a plurality of customers placing orders for goods from a plurality of vendors; each vendor fulfilling their orders by combining into individual shipping orders the goods ordered by those from among the plurality of customers who are geographically close to respective local pick-up points; and the vendors causing the respective shipping orders to be sent to the respective local pick-up points.

In accordance with another aspect of the present invention, there is provided an apparatus for controlling delivery of goods to a plurality of customers. The apparatus includes: means for receiving orders from a plurality of customers; means for fulfilling the customers' orders by combining into individual shipping orders the goods ordered by those from among the plurality of customers who are geographically close to respective local pick-up points; and means for causing the respective shipping orders to be sent to the respective local pick-up points.

In accordance with another aspect of the present invention, there is provided a system, having multiple vendors, for allowing the multiple vendors to consolidate shipping of goods to customers. Each vendor has an apparatus including: means for receiving orders from a plurality of customers; means for fulfilling the customers' orders by combining into individual shipping orders the goods ordered by those from among the plurality of customers who are geographically close to respective local pick-up points; and means for causing the respective shipping orders to be sent to the respective local pick-up points.

In accordance with yet another aspect of the present invention, there is provided a shopping server on a network comprising a plurality of vendor servers, a plurality of customer client terminals, and local pick-up points, the shopping server being operable to: receive orders from a customer terminal for purchase of a good; communicate with one of the local pick-up points in proximity to the customer who ordered the good, to determine if the ordered good is currently available at the local pick-up point; and if the good is not currently available at the local pick-up point, communicate with one of the vendor servers to initiate delivery of the ordered good to the local pick-up point.

In accordance with still another aspect of the present invention, there is provided a system, having multiple vendors, for allowing the multiple vendors to consolidate shipping of goods to fulfill customer orders received over a network. Each vendor has a network server operable to: receive orders from a plurality of customers; fulfil the customers' orders by combining into individual shipping orders the goods ordered by those from among the plurality of customers who are geographically close to respective local pick-up points; and cause the respective shipping orders to be sent to the respective local pick-up points.

In accordance with another aspect of the present invention, there is provided computer code executable on a network server. The code includes: code for receiving orders from a plurality of customers; code for fulfilling the customers' orders by combining into individual shipping orders the goods ordered by those from among the plurality of customers who are geographically close to respective local pick-up points; and code for causing the respective shipping orders to be sent to the respective local pick-up points.

DETAILED DESCRIPTION OF THE PREFERRED EMBODIMENT

FIGS. 1-4 illustrate preferred embodiments of the method and apparatus for distribution and delivery of Web orders in accordance with preferred embodiments of the present invention.

In a first preferred embodiment of the present invention, the system utilizes a wide area network (WAN) such as the Internet, and even more preferably, the World Wide Web ("the Web") to receive orders from consumers at a Web shopping portal. The system preferably includes an Internet (TCP/IP compliant) server that interacts with consumer client computers using the client computer's graphical user interface (GUI). The interface with the consumer preferably allows the consumers to interactively peruse shopping and delivery options, and more preferably, allows them to preview at any time the present state of their order. The above functionality is preferably achieved using a combination of server side applications, such as common gateway interface programs (CGI), for allowing the server to accept search terms and interface with databases, and client side applets, such as Java applets, or the like, which execute in client browser software. Additional functionality will permit the server to communicate with individual vendor sites and to coordinate and control a central database to keep track of the user's order and chosen options.

Figure 1A:
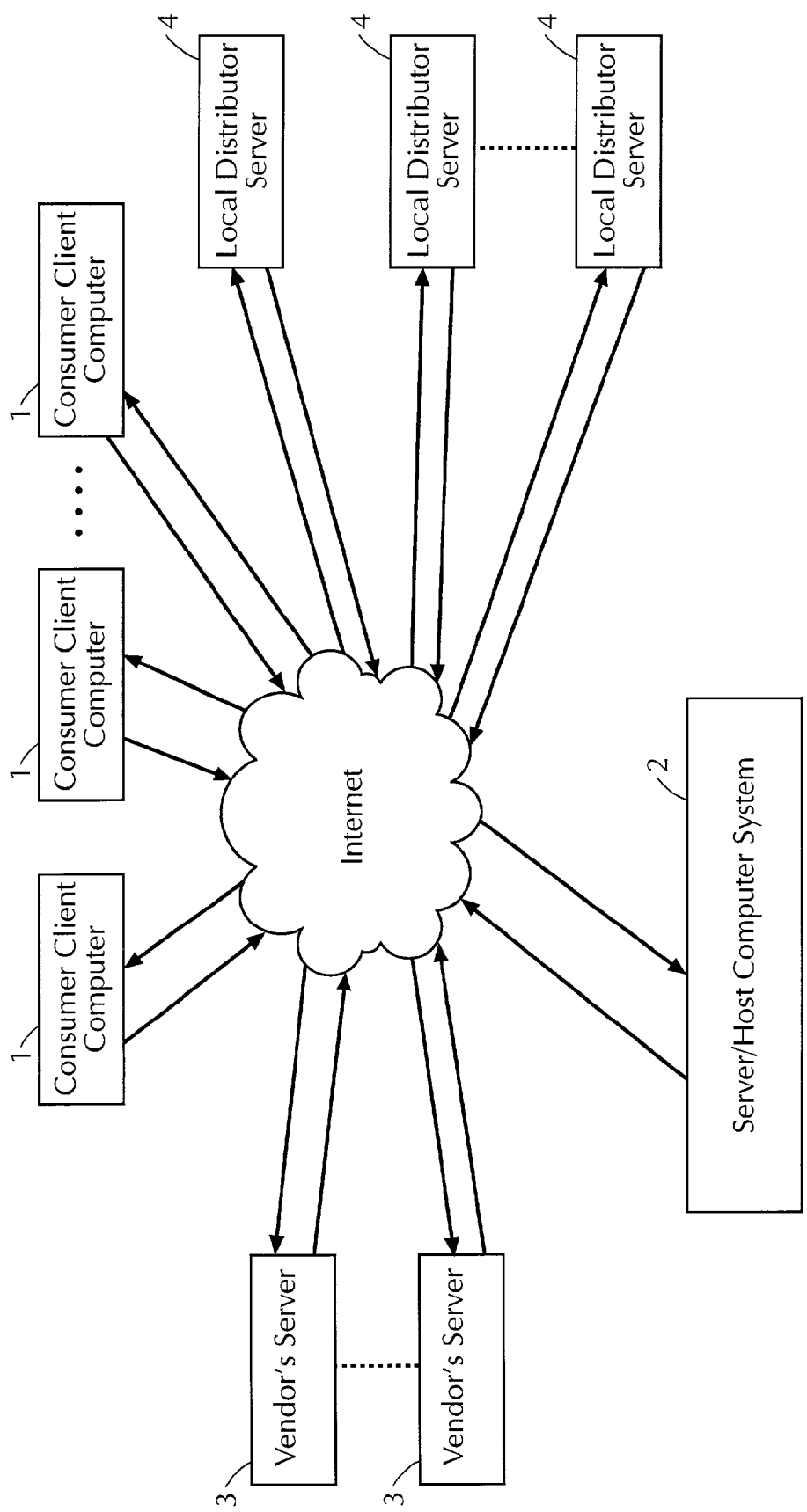
FIG. 1A is a block diagram of an Internet based implementation of the goods distribution method and apparatus of the present invention.

A preferred implementation of the Web-based distribution and delivery system of the present invention is illustrated in block diagram form in FIG. 1A. In that figure, consumers operating client computers 1 are connected to a wide area network (WAN) such as the Internet. Such connection can be direct or via an Internet service provider (not shown). The client computers 1 each preferably include communications hardware and an operating system with graphical user interface (GUI) functionality to allow for interface with the Internet. Each client computer preferably has graphical World Wide Web (Web) browser software, such as Netscape Navigator or Microsoft Internet Explorer, loaded thereon operable to read and send Hypertext Markup Language (HTML) forms from and to a Hypertext Transfer Protocol (HTTP) server on the Web. The client computer 1 preferably is operable to act as a virtual machine to run Java applets, or the like, downloaded by the browser from the server.

Server/host computer system 2 receives information from consumer client computers 1 over the Internet. The server/host computer system 2 preferably includes hardware, HTTP compliant software, an operating system and common gateway interface (CGI) software for interfacing with input queries and sources of data. The server/host computer system 2 also is in communication over the Internet with local distribution servers 4, and with vendor servers 3.

The term server as used in the present application is intended to include, in addition to hardware and software for implementing front-end Internet interfacing functions, also hardware and software to implement back-end computing and communications functions necessary to receive and process orders and organize shipping and payment information, such hardware and software techniques being well known in the art.

Figure 1B:
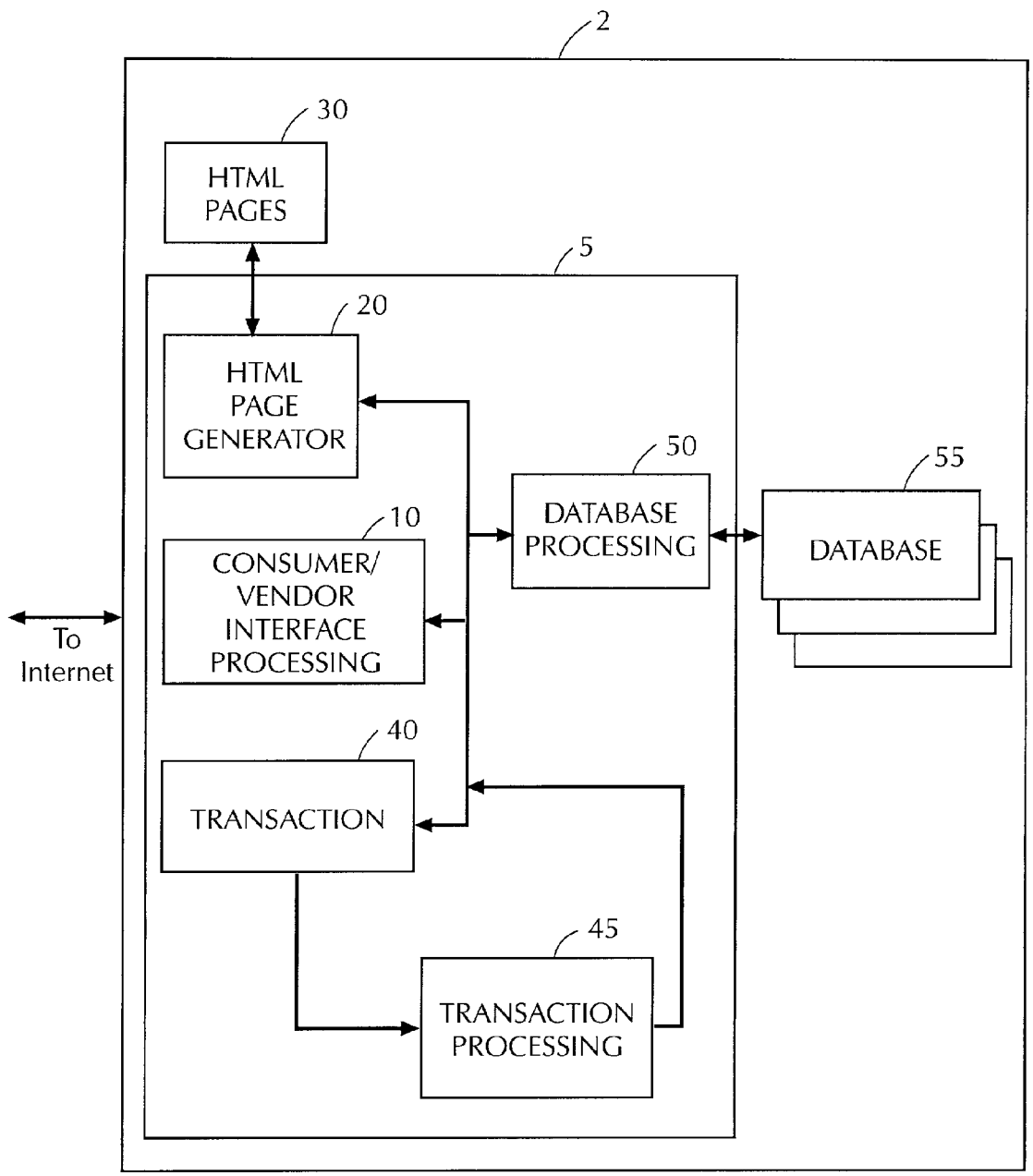
FIG. 1B is a block diagram of a server/host computer of the Internet based implementation illustrated in FIG. 1A.

A preferred implementation of the host site is illustrated in block diagram form in FIG. 1B. As shown in the figure, server/host computer system 2 is controlled by software functions of server processing 5. Among the constituent software components within the server processing 5 is the consumer/vendor interface processing 10. Consumer/vendor interface processing 10 functions to interface with, among others in the preferred embodiment, vendor servers 3, client computers 1 and local distributors 4. Interface processing 10 executes functions in response to input from client computers 1 and initiates communication with other servers, such as servers 3 and 4. Dynamic page generator 20 responds to requests from the client computers 1 for HTML pages 30, which themselves are stored in the server. Transaction 40 stores information for the present transaction and the transaction is completed by transaction processing module 45. Database processing 50 interfaces the server processing 5 with database 55.

In operation, in the Internet implementation, a consumer typically would type in a Uniform Resource Locator (URL) of the server/host computer system 2 and receive from the server/host computer system 2 an interactive form, such as an HTML document, as well as any Java applets, or the like, necessary to allow the consumer to view and submit his or her options for visiting vendor sites. The applets and CGI programs do verifications to ensure, for example, the consumer does not exceed limits related to the constituent Web vendors. Assuming the consumer request is within appropriate limits, the server processes the order and redirects, preferably with framing of the visual content, the user to the vendor selected by the user for each particular item currently being selected.

The server/host computer system 2 preferably communicates with a financial computer of the system to utilize input customer credit card information or the like for payment for a user's order.

In the first preferred embodiment of the present invention, the user of the present invention shops for items available through on-line vendors and periodically clicks an icon labeled to send the selected item to a central "shopping cart". Advantageously, the user need not concern him or herself with multiple shopping carts or the repeated submission of payment information, such as credit card numbers or the like.

Another advantage of the present invention is the provision of local pickup functionality. After the purchase of a filled shopping cart is consummated, the portal site communicates with a server at a local pick-up site, to earmark locally available purchased items for the user. Such earmarking saves shipping costs as to the locally available items, savings which can be passed along to the consumer.

In addition, because of the centralized Web site, automatic restocking of the local pick-up sites can easily be achieved.

The local pick-up site preferably has appropriate controls for perishables and the like. For example, refrigeration facilities for perishable goods.

Advantageously, in the case that the items are not available at the local site, the portal site's server preferably may initiate communication with the servers of the Web-sites offering items not locally available, to arrange for delivery of those items to the local pick-up site, and/or directly to the user. The user may select a date and time for local pick-up, or may alternatively be notified when pick-up is ready.

In a preferred embodiment, the order is customizable on the basis of certain user parameters. Such parameters may include, for example, the size of the user's vehicle, in which case the user would be notified in real-time if the addition of an item would exceed his or her vehicle's limits.

In another preferred embodiment, the purchaser would be notified in real-time as to the impact of the addition of an item will have on the delivery schedule. In a further refinement of this technique, a user selecting an item that is not locally available may be presented with optional items that are locally available. In another alternative embodiment, a user selecting branded items may be offered the option of selecting non-branded items, offered at a lower price and/or a quicker availability, instead. It will be appreciated after having read this specification that each of these options may be implemented using standard programming techniques used to interface between a server and client computer on the Web.

Database 55, for example, may hold an account for each customer which is updated whenever the customer places a new order and whenever the customer takes a delivery. Thereby the customer can interrogate the database to determine the current status of his account.

Figure 2:
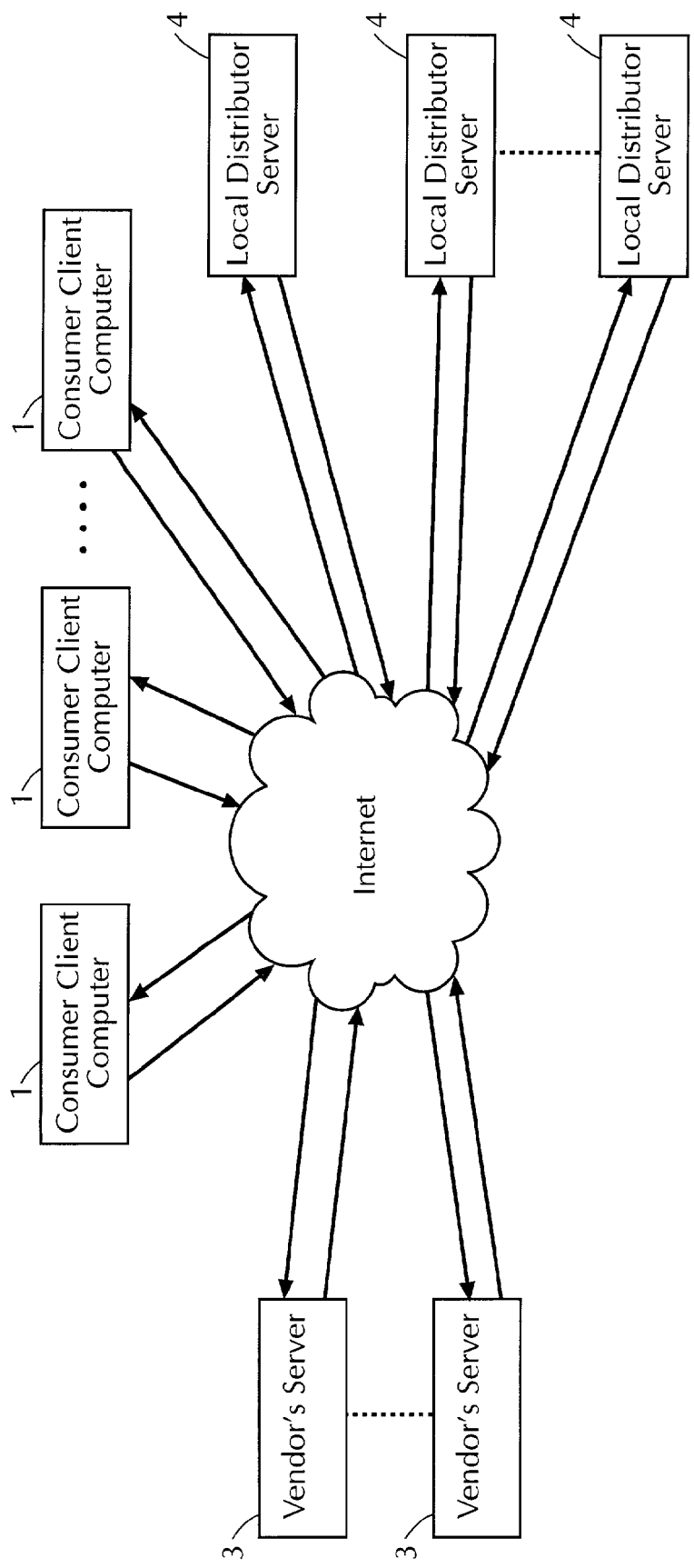
FIG. 2 is a block diagram of method of improved goods distribution in accordance with a second embodiment of the present invention.

In a second embodiment of the invention, as shown in FIG. 2, a consumer may order products directly over the Internet from an individual participating vendor or vendors rather than through a shopping portal as in the first embodiment. Once an order has been placed with the participating vendor, the consumer is presented with the option of selecting the local distribution site as the delivery address rather than the individual's home address. The choice of the local distribution preferably would be accompanied by a concomitant discount in the shipping cost to the consumer. In this embodiment, the customer's order and delivery information is held on the respective vendor and local distributor servers. This embodiment allows vendors to consolidate shipping, thereby reducing costs, since all items for all customers in a particular area would be shipped together to one location, instead to the individual addresses or P.O. Boxes of the individual consumers. Items in bulk shipment are preferably tagged to identify the customer via a tagging mechanism such as a bar code.

In accordance with a particularly preferred embodiment of the present invention, some or all participating vendors share local pick-up centers. This feature has the further advantage that all of a consumer's purchases, from multiple vendors, can be, with appropriate notice given to the consumer, picked up at a single site, at the same time, saving the consumer multiple trips. Notice to consumers is preferably effected via e-mail, although in an alternative implementation the customer could check the status of the order at the Web site of the vendor or of the local pick-up site, after having typed in security and identifying information, or via telephone.

As will be appreciated, once the customer has initially provided personal information to the server, cookies downloaded to the customer's browser, to be stored on the customer's computer, can be referenced by the Web site in subsequent visits of that customer to the Web site.

In a further preferred embodiment, the option of delivery from the local pick-up site can be offered for an additional charge. This option would still obtain the benefit to the vendor of consolidated shipping to a single site, while allowing the consumer to choose to pay a local delivery service to bring the goods to his or her house or business. Once again, the local pick-up option may preferably be chosen while at the vendor web site or the web site of the local pick-up site itself.

A variation of the second embodiment would entail the local pick-up site using its database of local consumers to help organize a buddy network, which would allow consumers from among a group of consumers located in the same area to assign a designated pick-up person for a predetermined period of time, that person, for example, picking up items for more than one neighbor. A further advantageous variation provides a discount for the designated pick-up person.

Figure 3:
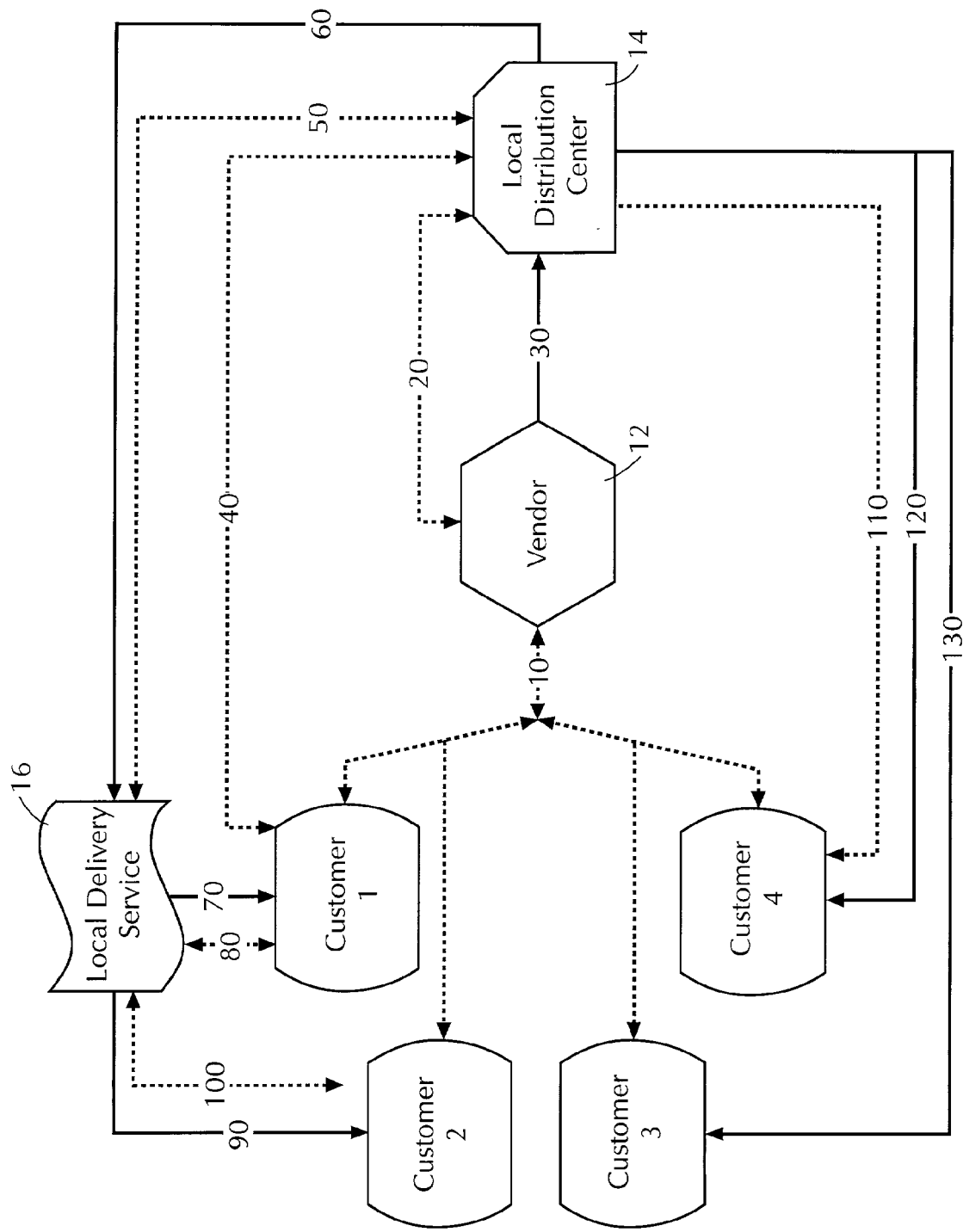
FIGS. 3 and 4 are product flow diagrams illustrating the flow of information and goods in accordance with advantageous aspects of the present invention.
Figure 4:
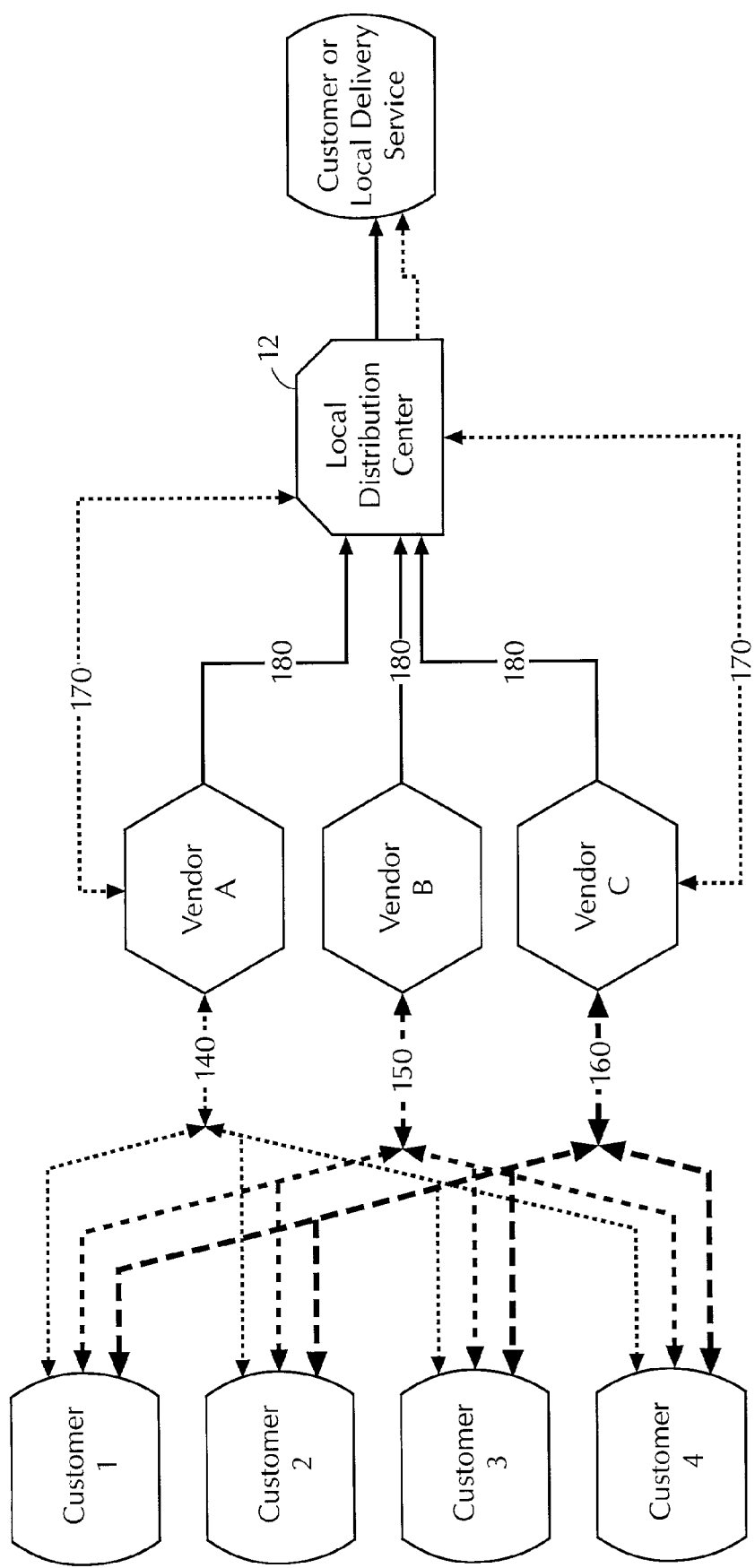

FIGS. 3 and 4 illustrate the product and information paths used by the illustrated shipping and distribution modalities of the present invention. In the figures, dashed lines represent the flow of information while solid lines represent the flow of goods.

FIG. 3 shows four possible variations for a multiple customer, single vendor, single local distribution center model. They are described as follows in conjunction with that figure.

In the first variation, customer 1 places an order with the vendor 12 by exchanging information (product preference, quantity, cost, credit card info, etc.) by an information exchange 10. The vendor 12 communicates with a local distribution center (LDC) 14 via information exchange 20 to determine if any items are in stock, inquire as to the delivery schedule, or the like. The vendor 12 then sends goods via shipping method 30. LDC 14 and customer 1 are in contact via information exchange 40 so that customer 1 can query about delivery status and the LDC 14 can notify of delivery. The LDC 14 is also in communication with a local delivery service (LDS) 16 via information exchange 50 to arrange delivery schedules, and other information related to delivery. The LDS 16 preferably is operable to pass information back and forth with customer 1 via information exchange 80. Goods flow via 60 from the LDC 14 to the LDS 16, which then delivers the goods to customer 1 via goods path 70.

In the second variation, customer 2 is identical to customer 1 except there is no direct communication between customer 2 and the LDC 14, as was the case for customer 1 and information exchange 40. Instead, in the second variation, all information to customer 2 is relayed from the LDC 14 to the LDS 16, through information exchange 50, and then from the LDS 16 to customer 2, via information exchange path 100. Goods are transferred through path 60 and then path 90 to customer 2.

In the third variation, customer 3 operates without making use of either the LDS 16 or a means of communication with the LDC 14. After the ordering, via information exchange path 10, and delivery from the vendor 12 to the LDC 14, utilizing paths 20 and 30, processing is complete, and customer 3 must physically go to the LDC 14 to pick up his or her goods via goods flow path 130.

In the fourth variation, customer 4 is identical to customer 3 but makes use of additional information exchange path 110 between the LDC 14 and customer 4 so that the customer can check on delivery status, etc. Goods are then picked up by customer 4, by means of goods flow path 120.

With knowledge of the orders of customers 1-4, the vendor 12 can consolidate the shipping of the orders and only schedule a single delivery to the LDC 14 to reduce shipping costs. Similarly, the LDS 16 can deliver, for example, both customer 1 and customer 2's orders on a single trip from the LDC 14.

FIG. 4 illustrates a multiple customer, multiple vendor, single LDC scenario utilizing the present invention. Each of customers 1 through 4 communicates with each of vendors A, B and C via information exchanges 140, 150 and 160. Optionally, the various orders could be placed via a single conduit, such as a common web page or universal shopping cart, as described above in relation to the first embodiment, that could be used by the customers to communicate centrally with the vendors rather than working on a one to one basis. After receiving the orders from the customers, the vendors then send physical goods to the LDC 12, via goods flow path 180, either in conjunction with data flow exchange 170, or without any information exchange capability between vendors and the LDC 12. From the LDC 12, goods and information can flow to customers via any of the methods described in FIG. 3.

While the communication methods used to implement the present invention have been described in terms of the preferred embodiment, namely via a WAN such as the Internet, and more particularly the Web, the invention can also be implemented by communication over telephone, facsimile, e-mail, or other methods of communication and still attain many if not all of the advantages discussed above.

Other variations and modifications of this invention will be apparent to those skilled in this art after careful study of this application. This invention is not to be limited except as set forth in the following claims.

What is claimed is:

1. An apparatus for controlling delivery of goods from multiple vendors to a plurality of customers, the apparatus comprising:
    means for receiving orders for multiple goods from a plurality of customers;
    means for determining, for each of the multiple goods, whether the good is currently available at a local pick-up point geographically close to an ordering customer, and treating each such good separately depending on whether the good is currently available at the local pick-up point, as follows:
        (i) in a case where the good is currently available at the local pick-up point, ear-marking that good for the ordering customer, and
        (ii) in a case where the good is not currently available at the local pick-up point, fulfilling the ordering customer's order by causing the good to be shipped to the local pick-up point in a shipping order in combination with goods ordered by those from among the plurality of customers who are geographically close to respective local pick-up points; and
    means for coordinating with the multiple vendors so as to arrange for shared shipping of ordered goods when respective ones from among the multiple vendors have received orders to be sent to identical local pick-up points.

2. An apparatus according to claim 1, wherein the orders are received via the Internet.

3. An apparatus according to claim 1, wherein a customer or a customer's agent retrieves a collection of goods from a local pick-up point.

4. An apparatus according to claim 1, further comprising:
means operable to allow a customer to select from among options relating to a pick-up point customized based on a type of item ordered and/or a pick-up capability of the customer.

5. A system, usable by multiple vendors, for allowing the multiple vendors to consolidate shipping of goods to customers, each vendor having an apparatus comprising:
means for receiving orders for multiple goods from a plurality of customers;
means for determining, for each of the multiple goods, whether the good is currently available at a local pick-up point geographically close to an ordering customer, and treating each such good separately depending on whether the good is currently available at a geographically close local pick-up point, as follows:
(i) in those cases where the good is currently available at a geographically close local pick-up point, ear-marking that good for the ordering customer, and
(ii) in those cases where the good is not currently available at the geographically close local pick-up point, fulfilling the ordering customer's order by causing the good to be shipped to the geographically close local pick-up point in an individual shipping order in combination with goods ordered by those from among the plurality of customers who are geographically close to the local pick-up point; and
means for coordinating with the multiple vendors so as to arrange for shared shipping of ordered goods when respective ones from among the multiple vendors have received orders to be sent to identical local pick-up points.

6. A system according to claim 5, wherein the multiple vendors' apparatuses are connected on a network.

7. A system according to claim 6, wherein the network is the Internet.

8. A system according to claim 5, wherein a customer or a customer's agent retrieves a collection of goods from a local pick-up point.

9. A system according to claim 5, wherein each vendor's apparatus further comprises:
means operable to allow a customer to select from among options relating to a pick-up point customized based on a type of item ordered and/or a pick-up capability of the customer.

10. A shopping server on a network including a plurality of vendor servers corresponding to a plurality of vendors, and a plurality of customer client terminals corresponding to a plurality of customers, the shopping server being operable to:
receive orders from a customer terminal for purchase of multiple goods;
for each of the multiple goods, communicate with one of a plurality of local pick-up points in proximity to a customer who ordered the good, to determine if the good is currently available at a local pick-up point, and treating each such good separately depending on whether the good is currently available at the local pick-up point, as follows:
(i) if the good is currently available at the local pick-up point, communicate with one of the vendor servers to ear-mark that good for the customer who ordered the good, and
(ii) if the good is not currently available at the local pick-up point, communicate with one or more of the vendor servers to cause the good to be shipped to the local pick-up point; and
coordinate with the plurality of vendors servers so as to arrange for shared shipping of ordered goods when respective ones from among the plurality of vendors have received orders to be sent to identical local pick-up points.

11. A shopping server according to claim 10, wherein the network is the Internet.

12. A shopping server according to claim 10, wherein a customer or a customer's agent retrieves a collection of goods from a local pick-up point.

13. A shopping server according to claim 10, wherein the shopping server is further operable to:
allow a customer to select from among options relating to a pick-up point customized based on a type of item ordered and/or a pick-up capability of the customer.

14. A system, having multiple vendors, for allowing the multiple vendors to consolidate shipping of goods to fulfill customer orders received over a network, each vendor having a network server operable to:
receive orders for multiple goods from a plurality of customers;
determine, for each of the multiple goods, whether the good is currently available at a local pick-up point geographically close to an ordering customer, and treat each such good separately depending on whether the good is currently available at the geographically close local pick-up point, as follows:
(i) in those cases where the good is currently available at the geographically close local pick-up point, ear-marking that good for the ordering customer, and
(ii) in those cases where the good is not currently available at the geographically close local pick-up point, fulfilling the ordering customer's order by causing the good to be shipped to the geographically close local pick-up point in an individual shipping order in combination with goods ordered by those from among the plurality of customers who are geographically close to the local pick-up point; and
coordinate with the multiple vendors so as to arrange for shared shipping of ordered goods when respective ones from among the multiple vendors have received orders to be sent to identical local pick-up points.

15. A system according to claim 14, wherein the network is the Internet.

16. A system according to claim 14, wherein a customer or a customer's agent retrieves a collection of goods from a local pick-up point.

17. A system according to claim 14, the network server being further operable to allow a customer to select from among options relating to a pick-up point customized based on a type of item ordered and/or a pick-up capability of the customer.

18. A computer-readable medium storing computer code that when executed causes a computer to perform a method for controlling delivery of goods from multiple vendors, wherein the method comprises:
receiving orders for multiple goods from a plurality of customers;
determining, for each of the multiple goods, whether the good is currently available at a local pick-up point geographically close to an ordering customer, and treating each such good separately depending on whether the good is currently available at the local pick-up point, as follows:
(i) in a case where the good is currently available at the local pick-up point, ear-marking that good for the ordering customer, and
(ii) fulfilling the ordering customer's order by, in a case where the good is not currently available at the local pick-up point, causing the good to be shipped to the local pick-up point in a single shipping order in combination with goods ordered by those from among the plurality of customers who are geographically close to respective local pick-up; and
coordinating with the multiple vendors so as to arrange for shared shipping of ordered goods when respective ones from among the multiple vendors have received orders to be sent to identical local pick-up points.

19. A computer-readable medium according to claim 18, wherein the network is the Internet.

20. A computer-readable medium according to claim 18, wherein the method further allowing a customer to select from among options relating to a pick-up point customized based on a type of item ordered and/or a pick-up capability of the customer.

21. A method for allowing multiple vendors to consolidate shipping of goods to customers, comprising steps of:
receiving orders for multiple goods from a plurality of customers;
determining, for each of the multiple goods, whether the good is currently available at a local pick-up point geographically close to an ordering customer, and treating each such good separately depending on whether the good is currently available at a geographically close local pick-up point, as follows:
(i) in those cases where the good is currently available at a geographically close local pick-up point, ear-marking that good for the ordering customer, and
(ii) in those cases where the good is not currently available at a geographically close local pick-up point, fulfilling the ordering customer's order by causing the good to be shipped to a geographically close local pick-up point in an individual shipping order in combination with goods ordered by those from among the plurality of customers who are geographically close to respective local pick-up points; and
coordinating with the multiple vendors so as to arrange for shared shipping of ordered goods when respective ones from among the multiple vendors have received orders to be sent to identical local pick-up points.

22. An apparatus according to claim 1, further comprising means for notifying a customer when an order is available for pick-up.

23. A system according to claim 5, wherein the apparatus further comprises means for notifying a customer when an order is available for pick-up.

24. A shopping server according to claim 10, wherein the shopping server is further operable to notify a customer when an order is available for pick-up.

25. A system according to claim 14, wherein the network server is further operable to notify a customer when an order is available for pick-up.

26. A computer-readable medium according to claim 18, wherein the method further comprises notifying a customer when an order is available for pick-up.

27. A method according to claim 21, wherein one or more of the multiple goods is ordered via the Internet.

28. A method according to claim 21, further comprising a step of notifying a customer when an order is available for pick-up.

29. A method according to claim 21, wherein a customer or a customer's agent retrieves a collection of goods from a local pick-up point.

30. A method according to claim 21, further comprising a step of enabling a customer to select from among options relating to a pick-up point customized based on a type of item ordered and/or a pick-up capability of the customer.

* * * * *

UNITED STATES PATENT AND TRADEMARK OFFICE
CERTIFICATE OF CORRECTION

PATENT NO. : 7,272,571 B2
APPLICATION NO. : 09/855558
DATED : September 18, 2007
INVENTOR(S) : Robert W. Tuttrup et al.

It is certified that error appears in the above-identified patent and that said Letters Patent is hereby corrected as shown below:

On the Title Page:
[56] REFERENCES CITED

Foreign Patent Documents
"10134300 A" should read --10-134300 A--.

Other Publications
After "Gooley, Toby,": "and" (first occurrence) should read --an--.

Insert:
--Paul Huppertz, "Market Changes Require New Supply Chain Thinking", Transportation & Distribution; Cleveland; March 1999, vol. 40, issue 3, pages 1-4.--
--Collin Barrett, "Combining Bills of Lading"; Traffic World; Washington; Feb. 1, 1999, vol. 257, Issue: 5. (*Abstract only*).--
--E-Logistics: The Brave New World of Online Market Places", Logistics Management and Distribution Report; Radnor; Apr. 2000, Supplement: e-logistics, start page E19-E23.--

COLUMN 1

Line 37, "clicking-on" should read --clicking on--.

COLUMN 2

Line 38, "pick-up" should read --pick up--.

COLUMN 6

Line 4, "like. For" should read --like, for--.
Line 53, "Boxes" should read --boxes--.

COLUMN 8

Line 30, Close up right margin.
Line 31, Close up left margin.

UNITED STATES PATENT AND TRADEMARK OFFICE
CERTIFICATE OF CORRECTION

PATENT NO. : 7,272,571 B2
APPLICATION NO. : 09/855558
DATED : September 18, 2007
INVENTOR(S) : Robert W. Tuttrup et al.

It is certified that error appears in the above-identified patent and that said Letters Patent is hereby corrected as shown below:

<u>COLUMN 10</u>

Line 5, "vendors" should read --vendor--.

<u>COLUMN 11</u>

Line 13, "pick-up;" should read --pick-up points;--.
Line 21, "allowing" should read --allows--.

Signed and Sealed this

Twenty-fourth Day of June, 2008

JON W. DUDAS
*Director of the United States Patent and Trademark Office*